United States Patent [19]

McLaughlin et al.

[11] Patent Number: 4,920,249

[45] Date of Patent: Apr. 24, 1990

[54] WELD BEAD WETTING ANGLE DETECTION AND CONTROL

[75] Inventors: Michael H. McLaughlin, Scotia; Carl M. Penney, Schenectady; Robert E. Sundell, Clifton Park, all of N.Y.

[73] Assignee: General Electric Company, Schenectady, N.Y.

[21] Appl. No.: 351,000

[22] Filed: May 8, 1989

[51] Int. Cl.$^5$ .............................................. B23K 9/12
[52] U.S. Cl. ........................... 219/130.21; 219/124.34; 219/137.71
[58] Field of Search ...................... 219/130.01, 130.21, 219/124.34, 137.71

[56] References Cited

U.S. PATENT DOCUMENTS

| | | |
|---|---|---|
| 3,612,818 | 10/1971 | Bechtle et al. . |
| 4,168,430 | 9/1979 | Denis et al. . |
| 4,219,720 | 8/1980 | Moench . |
| 4,225,771 | 9/1980 | Justice et al. . |
| 4,409,478 | 10/1983 | Libby . |
| 4,413,180 | 11/1983 | Libby . |
| 4,493,968 | 1/1985 | Brown . |
| 4,532,408 | 7/1985 | Richardson . |
| 4,567,347 | 1/1986 | Ito et al. . |
| 4,578,561 | 3/1986 | Corby, Jr. et al. . |
| 4,616,121 | 10/1986 | Clocksin et al. . |
| 4,634,879 | 1/1987 | Penney . |
| 4,645,917 | 2/1987 | Penney et al. . |
| 4,724,302 | 2/1988 | Penney et al. . |
| 4,777,769 | 10/1988 | McLaughlin et al. . |

OTHER PUBLICATIONS

*Welding Design & Fabrication,* Nov. 1984, pp. 45–48, "Laser Vision Robot Guides Welding Arc", Scholer Bangs.

*Automatix Product Bulletin,* "Autovision® 4 High Speed Vision System for Inspection or Robot Guidance".

*Primary Examiner*—Clifford C. Shaw
*Attorney, Agent, or Firm*—Paul R. Webb, II; James C. Davis, Jr.

[57] ABSTRACT

The wetting angle of a bead, such as a welding bead, is detected and controlled by a feedback operation. In particular, one or more optical profiler heads are used to detect the wetting angle along the edge of a bead. If the wetting angles differ from a preferred value, a feedback control system adjusts one or more weld parameters in order to bring the wetting angles to a desired value. If the wetting angle obtains a value which makes the weld joint completely unacceptable, an alarm condition may be activated. The detection of the bead wetting angles may be provided by two optical profiler heads, each head tracking a corresponding one of the edges or sides of the bead so as to provide information from which a corresponding wetting angle may be obtained.

20 Claims, 8 Drawing Sheets

4,920,249

WELD BEAD WETTING ANGLE DETECTION AND CONTROL

BACKGROUND OF THE INVENTION

This invention relates to bead wetting angle detection and control. More specifically, this invention relates to a method and system using optical profilers for quality control of a bead.

When performing an automated welding process, the bead wetting angle is a significant factor in determining the fatigue strength of a weld joint. If the wetting angle is too high, the likelihood of fatigue cracks is increased.

Although various feedback control systems have been used to control automated welding processes, such feedback control systems have generally been subject to one or more of several disadvantages. For example, some such systems have used 2D vision sensors directed toward the molten weld pool. Although knowledge about the weld pool is useful, it is not usually sufficient to determine some important characteristics of the bead which results after hardening of the weld pool. Other arrangements have used infrared or visible radiation detectors for sensing temperatures and temperature gradients of a newly-laid bead in order to determine the width of the weld bead or the severity of the metallurgical quench. Such radiation detection processes are often subject to error in the measurements because of variations in the surface conditions which may significantly affect apparent temperature gradients.

U.S. Pat. No. 4,724,302 filed in the name of Carl M. Penney and Michael H. McLaughlin issued on Feb. 9, 1988, assigned to the assignee of the present application, and hereby incorporated by reference, discloses an arrangement for control of bead processes such as welding and application of sealant or glue. A feedback control process is used in order to maintain the height, width, and/or cross sectional area of the bead satisfactorily.

Although stabilization of height, width, and area of a bead is useful, this does not necessarily maintain the bead wetting angle to a prescribed range. Moreover, knowledge of the height, width, and area of a bead would not necessarily allow one to know the bead wetting angle. Further, accurate measurement of the bead wetting angle usually requires a higher resolution than obtained from optical profilers which view the complete width of the bead, such as the optical profilers used in the above patent.

OBJECTS OF THE INVENTION

Accordingly, it is a primary object of the present invention to provide a new and improved bead process detection and control method and system.

A more specific object of the present invention is to provide bead process control which maintains bead wetting angles within acceptable ranges.

Another object of the present invention is to provide for the accurate detection of bead wetting angles.

SUMMARY OF THE INVENTION

The above and other objects of the present invention which will become more apparent as the description proceeds are realized by a method including the producing of a bead by moving a bead producing tool along one or more workpieces. The bead has first and second bead wetting angles, each angle being between a corresponding edge of the bead and an adjacent surface of a workpiece. Profile information is generated by using at least a first optical profiler head moved along the bead. The profile information is representative of the profile of at least part of the bead behind the bead producing tool. Bead wetting angle data representative of the at least one of the first and second bead wetting angles is derived from the profile information. The bead wetting angle data is compared to at least one reference. A changed value for at least one parameter is calculated dependant on the results of the comparison, the parameter being a parameter which affects the bead wetting angle. The operation of the bead producing tool is changed based upon the changed value of the parameter in order to realize feedback control of the at least one bead wetting angle. Preferably, the bead producing tool is a welding torch and the at least one parameter is selected from the group of welding torch voltage, welding torch current, speed of travel of the welding torch, and wire feed rate, if any, to the welding torch. More preferably, the calculating step includes calculating changed value for two parameters which affect the bead wetting angle and the changed values of the two parameters change the operation of the bead producing tool. In one embodiment, the two parameters are the wire feed rate and the welding torch current, whereas another embodiment uses a wire feed rate and a welding torch voltage. Alternately, or additionally, the at least one parameter which has changed is the speed of travel of the welding torch. The bead wetting angle data is representative of the first bead wetting angle along a first edge of the bead and the second bead wetting angle along a second edge of the bead. The profile information is supplied from moving the first optical profiler head along the first edge and from moving a second optical profiler head along the second edge. The first and second bead wetting angles are controlled to be positive and less than a predetermined value. The method may further include the steps of controlling the position of the first optical profiler head such that the first edge remains in the field of view of the first optical profiler head and controlling the position of the second optical profiler head such that the second edge remains in the field of view of the second optical profiler.

The system for bead production quality control according to the present invention includes a bead producing tool operable to produce a bead upon one or more workpieces, the bead having first and second bead wetting angles, each disposed between a corresponding side or edge of the bead and adjacent surface of the workpieces. A first optical profiler head is operable to generate profile information from the bead behind the bead producing tool. Means for processing the profile information and deriving bead wetting angle data representative of at least one of the first and second bead wetting angles from the profile information are used. Calculation means serves to compare the bead wetting angle data to at least one reference and to calculate changed values for at least one parameter which affects the bead wetting angle. Control means are responsive to the calculation means and are operable to change the operation of the bead producing tool based on changed values of the parameter and provide feedback control of the at least one of the bead wetting angles. A second optical profiler head is operable to generate profile information from the bead behind the bead producing tool. The means for processing derives bead wetting angle data representative of the first bead wetting angle from the first optical profiler head and independent of the second optical profiler head. In other words, the bead wetting angle data representative of the first bead wetting angle is not affected by the output of the second optical profiler head. In similar fashion, the means for processing derives bead wetting angle data representative of the second bead wetting angle from the second optical profiler head and independent of the first optical profiler head.

The method of the present invention may alternately be described as including the steps of moving first and second optical profiler heads adjacent a bead on one or more workpieces, the bead having first and second bead wetting angles, each bead wetting angle being between a corresponding side or edge of the bead and an adjacent surface on one of the workpieces. The first optical profiler head has a first field of view including a first edge of the bead and the second optical profiler head has a second field of view including a second edge of the bead. Profile information is generated from signals from the first and second optical profiler heads and bead wetting angle data is derived representative of the first and second bead wetting angles from the profile information. Bead wetting angle data representative of the first bead wetting angle is derived from operation of the first optical profiler head, independent of operation of the second optical profiler head. Bead wetting angle data representative of the second bead wetting angle is derived from operation of the second optical profiler head, independent of operation of the first optical profiler head. The first edge is not within the second field of view and the second edge is not within the first field of view. The bead may be produced by moving a bead producing tool along the workpiece, calculating a change value for the at least one parameter, and changing the operation of the bead producing tool based on the changed value in order realize feedback control of both the first and second bead wetting angles.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION OF THE INVENTION

Figure 1:
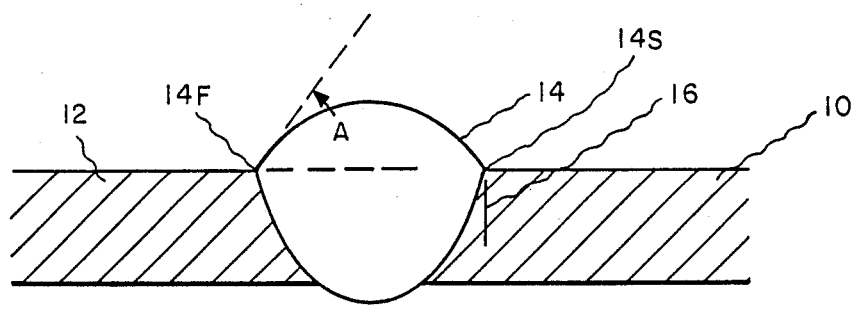
FIG. 1 shows an end view of a bead having a high bead wetting angle.

The problems associated with a high bead wetting angle are illustrated in FIG. 1. A workpiece 10 is welded to the workpiece 12 with the weld bead 14 disposed therebetween. At the first edge or side 14F of bead 14 an angle A is defined. A similar angle (not separately labeled) is defined along the second edge or side 14S of bead 14. If the angle A on either side of the bead 14 is too great, a fatigue crack 16 is more likely to form as a result of the excess weld reinforcement shown for FIG. 1. To try to minimize fatigue cracks such as 16, the bead 14 may be treated by grinding to remove portion 14R shown in phantom line in FIG. 2. Although the removal of portion 14R decreases the weld reinforcement, the actual angle A remains the same for FIG. 2 as it was for FIG. 1. The grinding of portion 14R has failed to change the angle and is unlikely to improve the fatigue strength of the joint.

Figure 3:
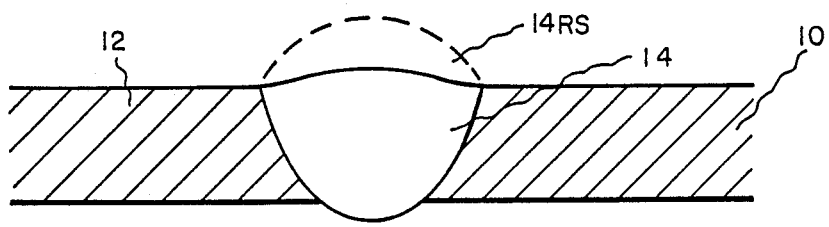
FIG. 3 shows a bead like that of FIG. 1 wherein portions have been removed by more complete grinding than that illustrated by FIG. 2.

In FIG. 3, the bead 14 of FIG. 1 (before the development of crack 16) has been properly treated by removing portion 14RS from the bead 14. This results in the bead 14 "blending" more into the workpieces 10 and 12 and greatly lowers the angle A (not separately illustrated in FIG. 3). By reducing the angles at the edges or sides of bead 14 to be very small positive values, one can decrease the likelihood of cracks such as 16 developing. (Other structural problems may develop if the angle becomes negative, corresponding to insufficient material added to the weld joint.) Depending upon the use of workpieces 10 and 12, one might also have to grind the bottom of the bead 14 to blend into the lower surfaces of workpieces 10 and 12.

Figure 2:
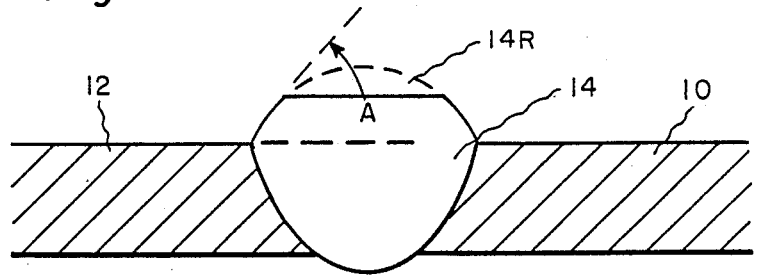
FIG. 2 shows an end view of a bead like that of FIG. 1 after some portions have been removed by grinding.

As shown in FIG. 2, the attempt to correct the bead of FIG. 1 might not succeed because it might not change the weld bead wetting angles. Although the grinding operation resulting in the removal pattern illustrated in FIG. 3 is somewhat more successful, it is disadvantageous to need such a grinding operation.

Figure 4:
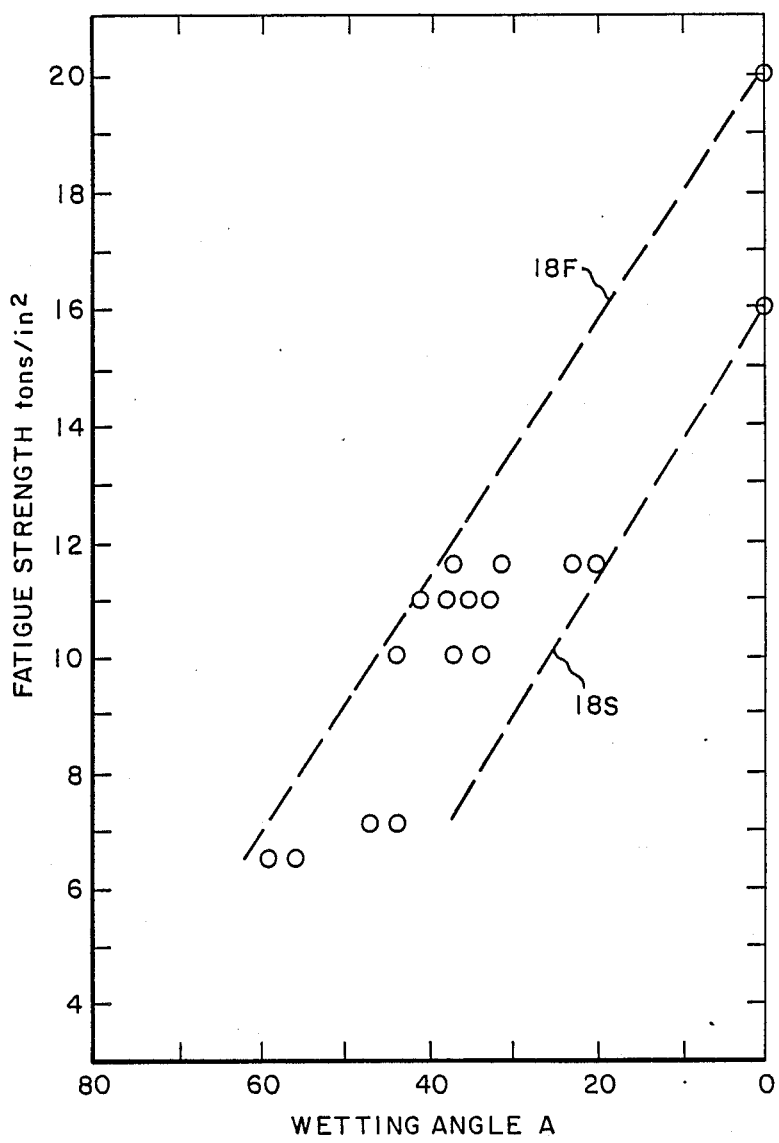
FIG. 4 is a graph a relationship between bead wetting angle and fatigue strength for weld joints.

With reference to FIG. 4, there is shown a relationship between the fatigue strength and the wetting angle. The fatigue strength of the vertical scale of FIG. 4 represents the upper stress of $2 \times 16^6$ cycles, whereas curves 18F and 18S represent approximations for plain plates with alternate treatments and based upon the empirical data points illustrated.

Figure 5:
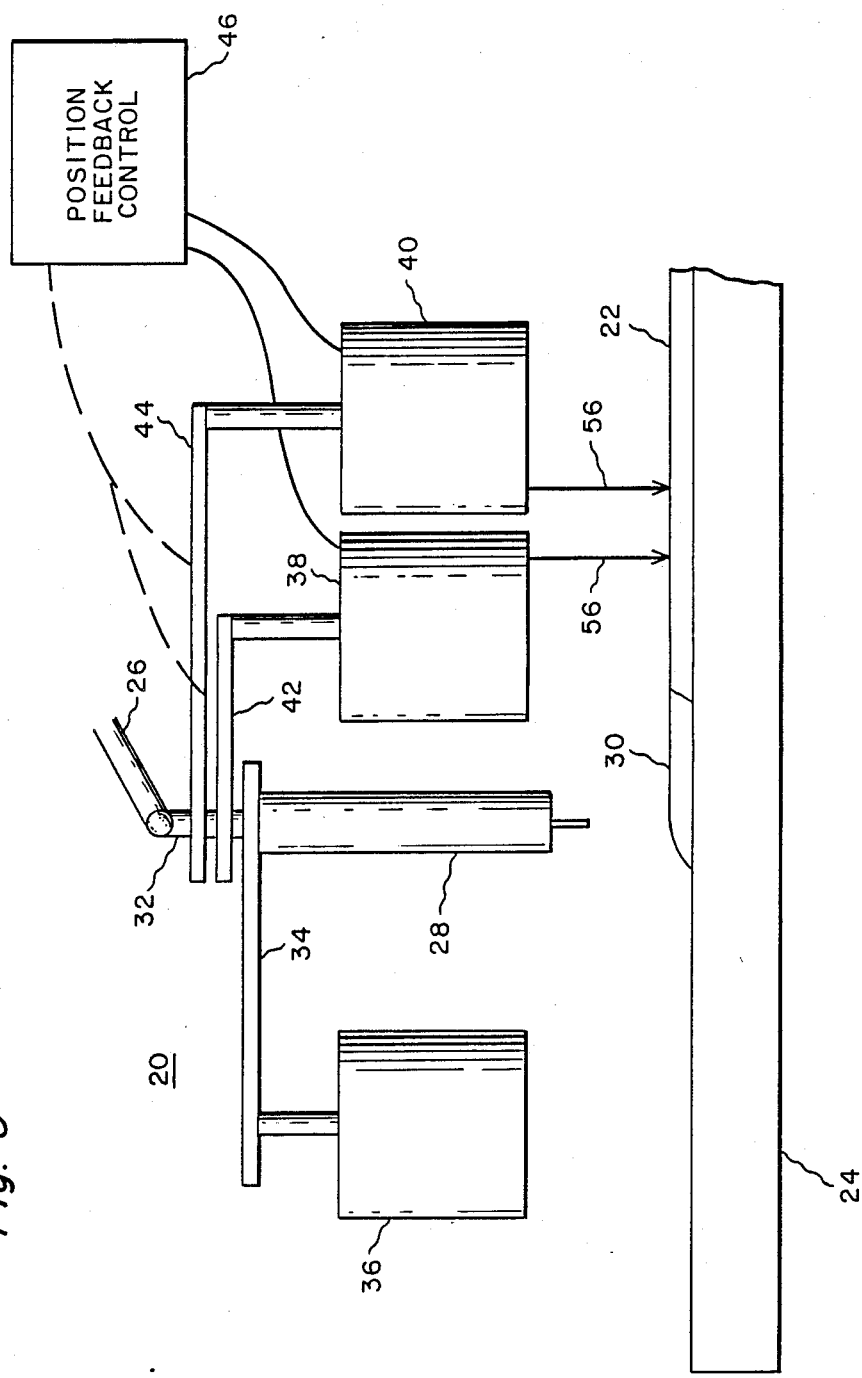
FIG. 5 is a simplified side view of an embodiment of the present invention.

An assembly 20 according to the present invention is shown in FIG. 5. The assembly 20 is used for producing a weld bead 22 to connect a workpiece 24 to an adjacent workpiece disposed behind workpiece 24 in the view of FIG. 5. The assembly 20 advantageously will provide for feedback control of the bead 22 such that the bead wetting angles are maintained within a given range. A robot arm 26 moves a weld torch 28 along a seam between workpiece 24 and the adjacent workpiece (not visible in FIG. 5) so as to form molten weld puddle 30 which hardens into weld bead 22. The torch 28 is mounted upon a member 32 attached to arm 26. A support 34 fixes a tracking profiler head 36 relative to torch 28. The tracking profiler head 36 may be used to insure that the weld torch 28 tracks the seam in a manner which need not be described in detail as this feature is not central to the present invention. Generally, the member 32 and support 34 may rotate about a vertical axis central to member 32 relative to the robot arm 26. However, it should also be noted that the present invention may be implemented without the use of a tracking profiler if the weld torch 28 or other bead producing tool is to follow a prescribed path which is sufficiently definite that there is no need for real time adjustment in the path.

As illustrated in simplified fashion, optical profiler heads 38 and 40 are respectively pivotably attached to member 32 by respective supports 42 and 44. The heads 38 and 40 are independently controlled by a position feedback control 46 shown in block form. The position feedback control 46, which may have two identical circuits, one for controlling head 38 and one for controlling head 40, is used to insure that the field of view of each of the profilers 38 and 40 includes a corresponding edge of the bead 22.

Figure 6:
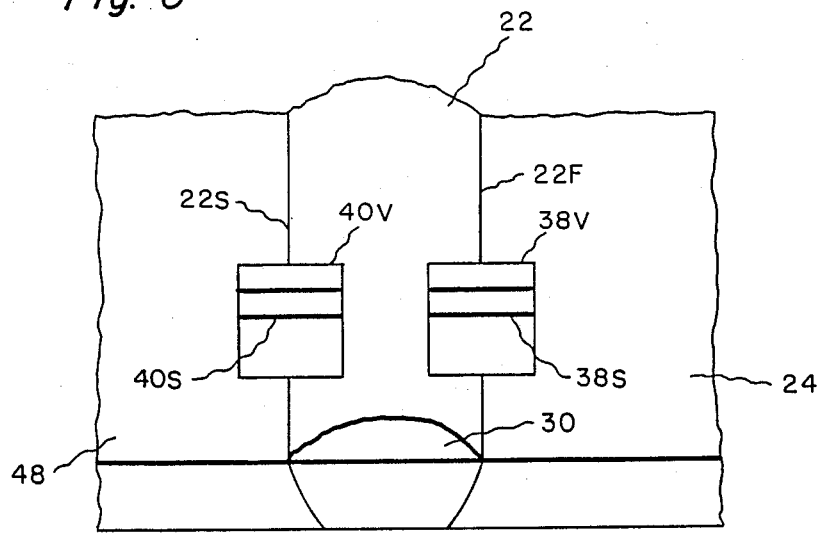
FIG. 6 shows a top view of a bead laid upon two workpieces by the present invention.

The arrangement of FIG. 5 shows heads 38 and 40 spaced lengthwise (i.e., in the direction of the bead) from each other. If the heads are spaced in the lengthwise direction, the view from one head may be suitably delayed by various known electrical delay elements (not shown) so that the two fields of view used for processing are at the same lengthwise position as shown in FIG. 6. In other words, there is no lengthwise offset between the fields of view 38V and 40V, at least when the field of view data is used for feedback control for the bead wetting angles in a manner discussed in more detail below.

The tracking profiler 36 and, more importantly to the present invention, the profiler heads 38 and 40, which track corresponding edges of bead 22, are optical profilers which should be of the form described in U.S. Pat. No. 4,645,917 by Penney et al. entitled "SWEPT APERTURE FLYING SPOT PROFILER", assigned to the assignee of the present application and hereby incorporated by reference. Alternately, the optical profilers of FIG. 5 might be of the form described in U.S. Pat. No. 4,634,879 by Penney entitled "METHOD AND SURFACE FOR DETERMINING SURFACE PROFILE INFORMATION", assigned to assignee of the present application and hereby incorporated by reference. By using an optical profiler which images a portion of the bead according to its height (i.e., distance between the workpiece and upper surface of the bead 22), one can obtain a quite accurate image of the topography of the bead. The position feedback control 46 may use such information to detect the edges of the bead 22 and to control servomotors (not shown) which rotate arms 42 and 44 such that the respective heads 28 and 40 will remain focused on corresponding edges of the bead 22.

As shown in the view of FIG. 6, the fields of view 38V and 40V corresponding to heads 38 and 40 respectively track the first and second edges or sides 22F and 22S of bead 22. As an alternative to the position feedback control of the heads 38 and 40, one might alternately maintain the fields of view 38V and 40V sufficiently wide to insure that the edges 22F and 22S will remain in the corresponding fields of view 38V and 40V. Provided that the width of the bead 22 is sufficiently stable and depending on the width of the field of view 38V and 40V, the heads 38 and 40 could be mounted to a common housing (not shown) with position feedback control to track the bead in such manner that the separate fields of view 38V and 40V will always include the corresponding bead edge 22F and 22S. The fields of view 38V and 40V include respective view stripes 38S and 40S which may collectively correspond to the view stripe 58 in FIG. 2 of the incorporated by reference Penney et al SWEPT APERTURE patent.

Figure 7:
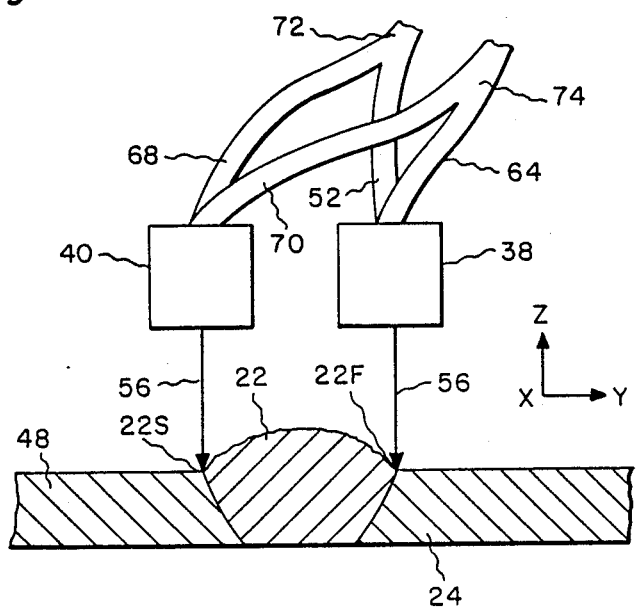
FIG. 7 shows a cross section front view of the bead and workpieces of FIG. 6 together with two optical profiler heads according to the present invention.

The profile heads 38 and 40 will be discussed with Reference to FIGS. 7 and 8, the construction of each head being as shown for head 38 in FIG. 8. In particular, the head 38, which is illustrated schematically, includes a lens 50 to receive light from fiber optic bundle 52 and apply the light to mirror 54 such that it is reflected as beam 56 which falls adjacent to one side of the bead 22. The beam 56, which may be scanned in the X and Y directions by operation of an X-scanner deflector (not shown) and a Y-scanning mirror (not shown) in accord with the Penney et al. SWEPT APERTURE patent, causes a reflected beam 58 which passes through filter 60 to lens 62 and into fiber optic bundle 64.

Figure 8:
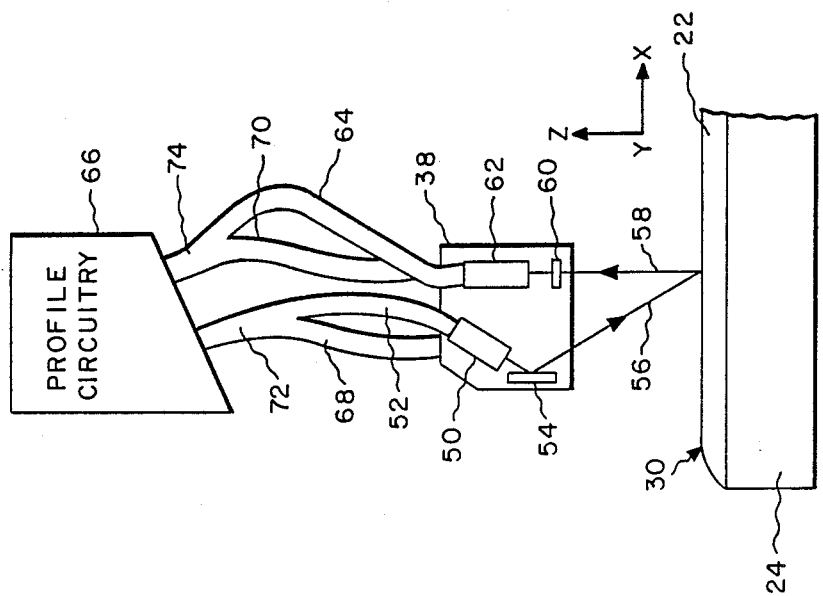
FIG. 8 shows a side view of the arrangement of FIG. 7.

The beams 56 from each head 38 and 40 should be spaced slightly behind the back of molten pool 30 in the manner shown in FIG. 8 for the beam 56 from head 38. Heat and spatter keep one from placing the heads 38 and 40 too close to the back of molten pool 30. Shields (not shown) could be used to protect the heads 38 and 40.

Profiling circuitry 66 may be used to generate the beam 56 and determine profile information from the beam 58 in the manner described in more detail in the Penney et al. patent. If desired, the coherent fiber optic bundles 52 and 64 may respectively merge into coherent fiber optic bundles 68 and 70 which connect to head 40 (not visible in FIG. 8) and correspond in function to bundles 52 and 64. By merging the transmission bundles 52 and 68 together and the receiving bundles 64 and 70 together, one may use a single profile circuitry arrangement 66 to scan and receive light with the two heads 38 and 40. In effect, such a "split-optic" arrangement is utilizing head 38 one-half of the time and head 40 one-half of the time. Although the merger of bundle 52 and 68 and the merger of bundle 64 and 70 is shown simply as two bundles joined together, various optical connectors could alternately be used such that the profile circuitry 66 applies a laser to overall transmission bundle 72 and receives reflected energy from overall receiving bundle 74 with the profiler using bundles 68 and 70 for one-half of the time corresponding to field of view 40V in FIG. 6 and using bundles 52 and 64 for the other half of the time corresponding to field of view 38V in FIG. 6.

It should be appreciated that the "split-optic" arrangement of FIG. 8 is not required for implementation of the present invention as the heads 38 and 40 could be connected to separate profile circuitry which operates in the manner described in more detail in the incorporated by reference Penney et al. SWEPT APERTURE patent. It should also be recognized that a single high resolution profiler can provide a profile of the entire bead and adjoining surface from which information both angles can be calculated.

Figure 9:
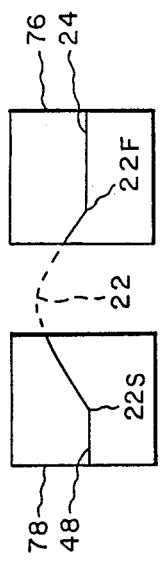
FIG. 9 is a schematic illustrating how the fields of view of the two profiler heads of FIG. 7 relate to the bead.
Figure 10:
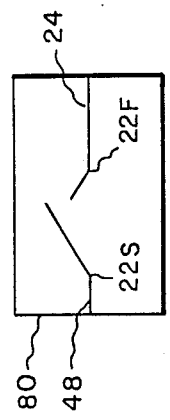
FIG. 10 is illustrative of a composite view from the two profiler heads of FIG. 7.

As shown in FIG. 9, the profile circuitry 66 generates a split image corresponding to the profiles within blocks 76 and 78. This split image includes the first and second edges 22F and 22S of the bead 22, but need not include the center of the bead 22. Accordingly, the lens 50 and 62 (refer back momentarily to FIG. 8) and the corresponding lens for the other head may provide a high resolution as will be desirable for accurately determining the bead wetting angle at edges 22F and 22S. As shown in FIG. 10, the merger of the profile information generates the information shown within block 80. This provides for concentrating the profile information at those portions (i.e., the edges or sides) of the bead 22 where the information is most needed.

Figure 11:
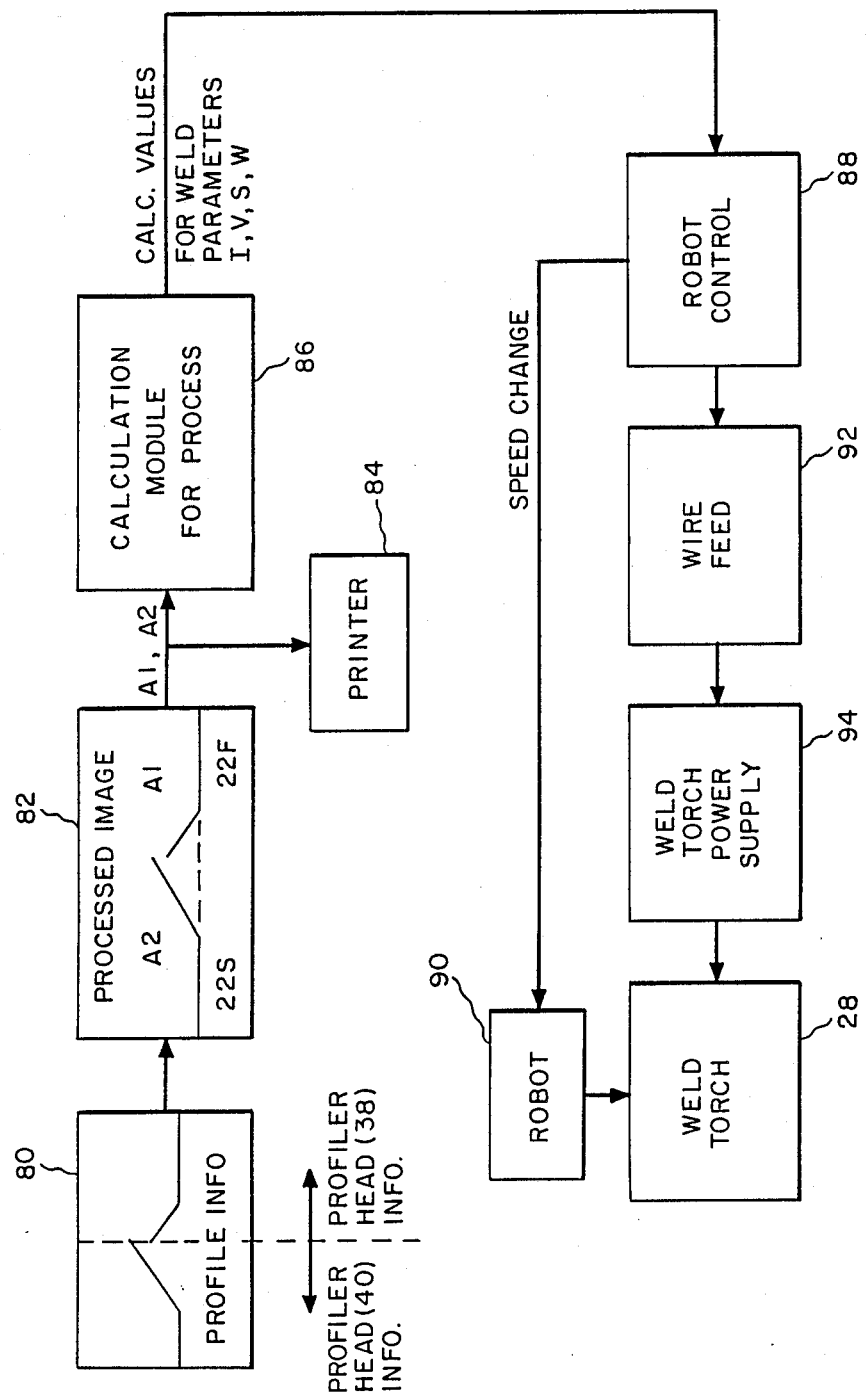
FIG. 11 illustrates the feedback control system of the present invention.

With reference now to FIG. 11, the use of the profile information corresponding to block 80 is illustrated as part of a feedback control loop for stabilizing the angles A1 and A2 illustrated within block 82, which block corresponds to a processing means. The processing means or processor 82, which may be a microprocessor or other known component, may use a known process for determining the angle from profile or topographic information. The derived bead wetting angle data A1 and A2 may be supplied to a printer 84 as well as a calculation module 86. It should be noted that the bead wetting angle data A1 is independent of information derived from profiler head 40, whereas the angle data A2 is independent of information derived from the profiler head 38.

The calculation module 86, which might be a part of the same microprocessor used for realizing the image processor 82 or might be separate therefrom, uses the wetting angle data A1 and A2 to calculate the values for one or more weld parameters. In particular, the module 86 calculates values of weld parameters such as the weld torch current I (for MIG or metal inert gas welding), welding torch voltage V (for TIG or Tungsten inert gas welding), speed S of travel of the welding torch 28 along the seam, and/or wire feed rate W for those weld torches having a wire feed. (The invention could, of course, be used for autogenous welding.)

The process used by the calculation module 86 to generate changed values for one or more weld parameters will be discussed in more detail below. Generally, however, the module 86 calculates a changed value for one or more of the parameters and supplies the changed value to a robot control 88 which may cause a speed change of robot 90 if such a speed change is indicated. Alternately, and/or additionally, the robot control 88 may cause a change in the feed rate of the wire feed 92 and/or a change in the weld torch power supply at 94 (voltage or current depending upon the type of weld torch 28 which is used). At any rate, the module 86 is part of a feedback control loop for stabilizing the angles A1 and A2 at relatively low positive values.

Figure 12:
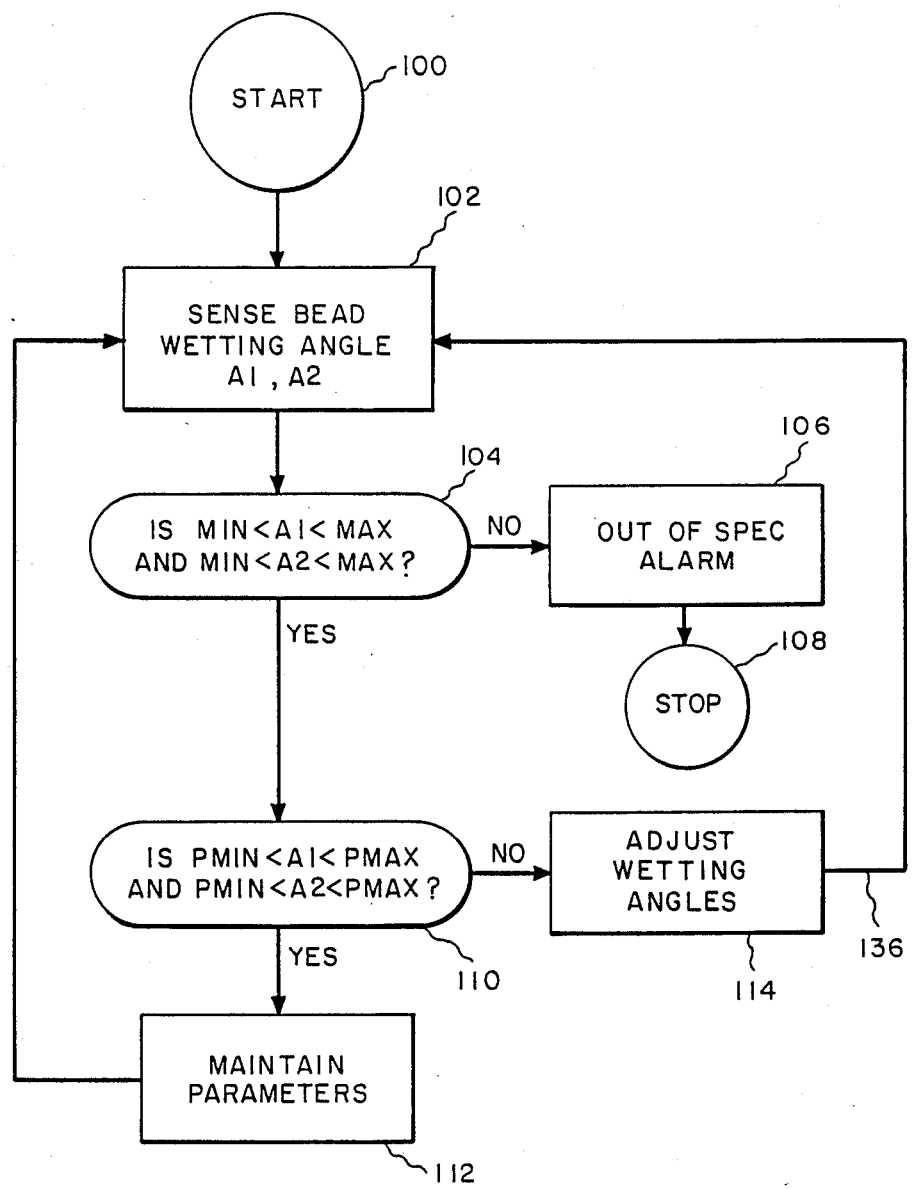
FIG. 12 is a simplified flow chart illustrating the operation of a portion of FIG. 11.

FIG. 12 shows a flow chart illustrating a process which may be carried out by the calculation module 86 of FIG. 11. In particular, the start 100 leads to the sensing of the bead wetting angles at block 102 corresponding to the module 86 receiving the bead wetting angles from processor 82 (in FIG. 11). Block 102 of FIG. 12 leads to decision block 104 which tests each of the angles A1 and A2 to determine if both angles are within a particular range between a minimum MIN and a maximum MAX. If the block 104 finds that either of the angles is outside the acceptable range, block 104 leads to block 106 corresponding to an alarm condition which indicates that the weld joint is unacceptable and goes to a stop 108.

If decision block 104 indicates that the angles are within the relatively large range corresponding to the minimum and maximum values, the decision block 110 may determine if the angles are within a smaller range corresponding to a preferred minimum PMIN and a preferred maximum PMAX. For example, the range of block 104 might be between 0° and 15°, whereas the range of block 110 might be between 1° and 3°. At any rate, if decision block 110 finds that the two angles are within the smaller preferred range, this leads to block 112 which will maintain the weld parameters in their previous values and return to block 102. It should be noted that block 110 is optional and the yes response to decision block 104 might instead lead directly to block 114 which serves to adjust the wetting angles.

Whether the block 114 is entered directly from a yes response to block 104 or is entered following a no response to block 110, block 114 is used to calculate changed values for one or more of the weld parameters in order to adjust the wetting angles so as to bring them closer to a desired value or values.

Figure 13:
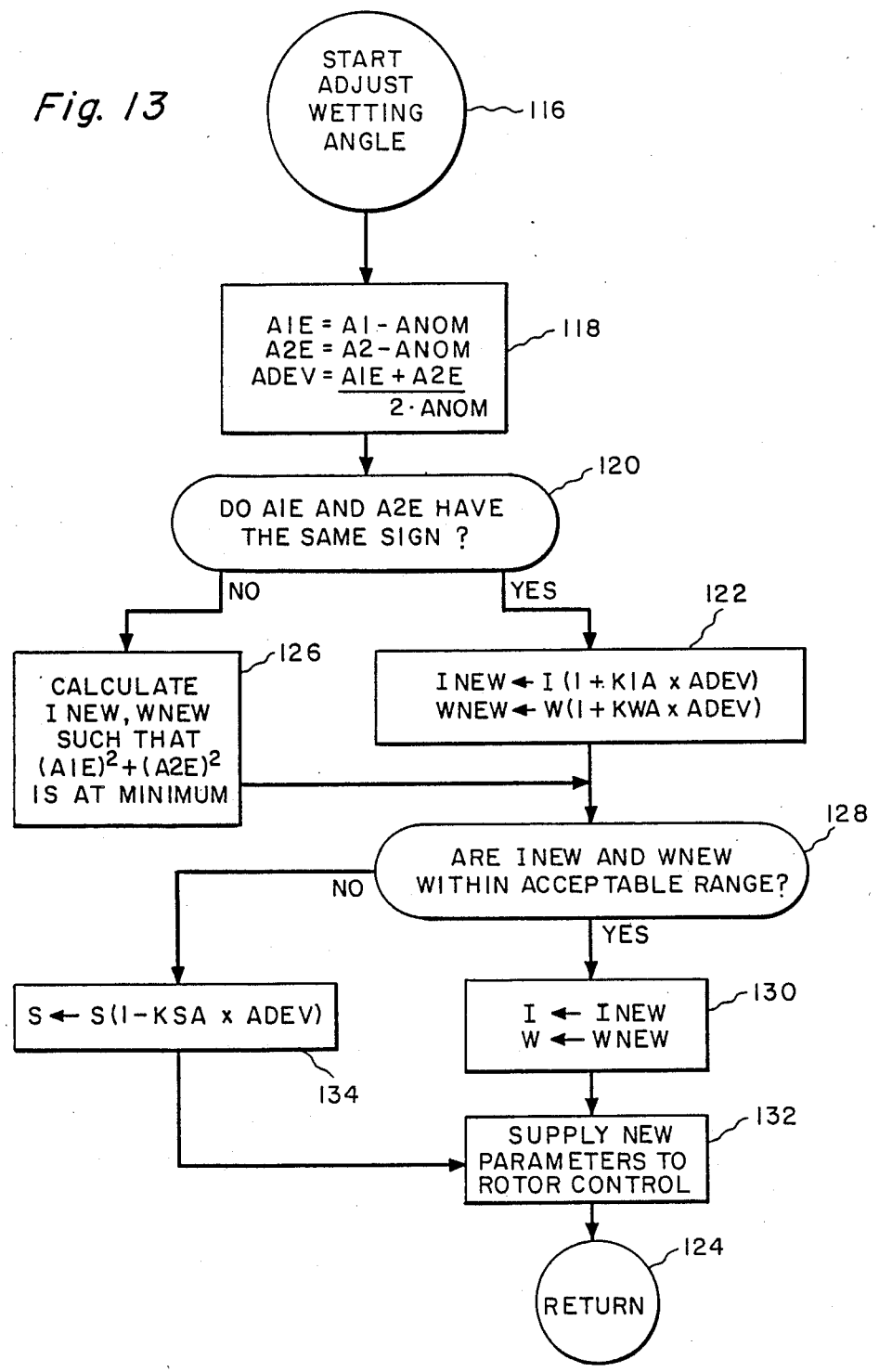
FIG. 13 is a simplified flow chart illustrating a subroutine which may be used in connection with FIG. 12.

The block 114 may be realized by the subroutine of FIG. 13. In particular, the start block 116 leads to block 118 which defines error signals (A1E and A2E) as the difference between the respective wetting angle and a nominal or preferred angle ANOM. Additionally, block 118 defines an average deviation value ADEV as equal to the sum of the error signals divided by twice the nominal value. Block 118 leads to block 120 which tests to determine if the error signals both have the same sign. In other words, do both wetting angles deviate from the nominal value in the same direction (both wetting angles being above the nominal value or both wetting angles being below the nominal value)? If the answer is yes, block 120 leads to block 122. Block 122 will be used to calculate new or changed values for weld parameters corresponding to the current I and the wire feed rate W, but it will be understood that one or more other weld parameters could be used. Block 122 in particular defines a new value for current INEW as equal to the prior value for current I changed by a constant (KIA) multiplied by the average deviation ADEV. The constant DIA would be determined by empirical results. For example, if empirical tests showed that a 1° change in the wetting angles can be obtained by changing the current by 5%, the magnitude of KIA would be 0.05 such that an average deviation of 1° would cause a 5% increase or decrease between INEW and the previous value current I. In similar fashion, the block 122 will define a wire feed new value WNEW as equal to the previous value wire feed W increased or decreased by an amount dependent on the product of the average deviation and a constant KWA which would be determined in similar fashion to the calculation of KIA. The values for KIA and KWA would likely be negative since too high an angle would be reduced by decreasing the wire feed rate W and the voltage V. It should be noted that the values KIA and KWA might, in more sophisticated approaches, be variable depending upon the previous value of the current or wire feed. In other words, a sophisticated approach could compensate for the fact that a 5% increase in current at one place on the current curve might change the angle a given amount, whereas a 5% increase in current at a different place on the current curve might change the angle a different amount.

If block 120 determines that the error signals have opposite polarities, this means that one of the bead wetting angles is above the nominal value and the other bead wetting angle is below the nominal value. Although not illustrated, this might be simply handled by having the no response to block 120 lead to return at block 124 which would return to block 102 of FIG. 12. The approach illustrated in FIG. 13 would have the negative response to decision block 120 lead to block 126 which would use an alternate procedure for calculating INEW and WNEW so as to minimize the sum of the squares of the error signal. Various known minimization procedures might be used after developing data indicating the relationship between the current, wire feed rate, and the bead wetting angles.

Although not illustrated, a separate test block could signal an alarm condition if the angles A1 and A2 differ by more than a given amount.

Block 126 joins with the output of block 122 to lead to block 128 which tests to determine that the values INEW and WNEW are within acceptable ranges. For example is the current too high for the power supply to operate? Assuming that the parameters are within acceptable ranges, block 128 leads to block 130 which replaces the current I with INEW and replaces the wire feed rate W with WNEW. Block 130 then leads to block 132 which supplies the new parameters to the robot control (refer back momentarily to block 88 of FIG. 11).

If the new values for current and wire feed rate are determined by block 128 to be outside an acceptable range, one might simply change the values a smaller amount. However, FIG. 13 shows an arrangement whereby a negative response to decision block 128 leads to block 134 which changes the speed based upon a coefficient indicating a relationship between a change in speed and a resulting change in the bead wetting angles. The coefficient KSA of block 134 would be determined in similar fashion to the coefficient KIA in block 122. Block 134 simply shows a change in the speed S of the robot but one could alternately test to determine if the new speed is acceptable in similar fashion to the decision block 128. Generally, a simpler arrangement can be used if the speed is not used to control the bead wetting angle. For one thing, the production speed will of course be affected by such a change. However, the speed could alternately be the weld parameter which is initially changed to provide the proper bead wetting angles through feedback control.

Block 134 leads to block 132 which supplies the changed or new values of the parameters to the robot control as discussed above. Block 132 leads to return 124 which returns to the line 136 extending between block 114 and block 102 of FIG. 12.

Although the present discussion has concentrated on the use of the present invention for controlling the wetting angle of a weld bead, the present invention, in its broadest aspects, is applicable to other bead producing tools such as a sealant or glue gun (not shown). For example, one might use a heated nozzle on a gun and the heating of the nozzle might be controlled as part of the feedback loop to control the angle at which the bead of glue or sealant hardens.

Figure 14:
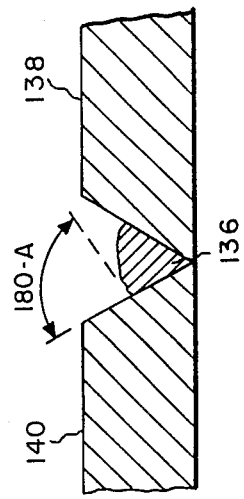
FIG. 14 is a cross-section of a multi-pass weld joint upon which the present invention might be used.

The present invention might also be used in connection with a multi-pass weld bead 136 of FIG. 14. The bead 136 at the joint between workpieces 138 and 140 will have a wetting angle, the complement of which is shown in FIG. 14 for ease of illustration. Although the bead wetting angles for a single pass weld joint are preferably small positive values as discussed above, the most desirable values for a multi-pass bead wetting angle might fall within some other range.

If desired, one could use control of the bead wetting angle in a more sophisticated arrangement wherein feedback control is maintained of various other characteristics of the welding system. For example, the calculation module 86 of FIG. 11 of the present application could be used in combination with, or in place of, the calculation module 34 of FIG. 7 of the incorporated by reference U.S. Pat. No. 4,724,302 Penney et al. patent.

Some bead processing tools may provide wetting angles which are essentially identical on opposite edges of the bead (i.e., A1 effectively always equals $A_2$). Under such circumstances, a single profiler head such as 38 or 40 (FIGS. 5 or 7) might be used to sense a single wetting angle while providing sufficient data to effectively control both wetting angles.

Although various specific instructions have been discussed herein, it is to be understood that these are for illustrative purposes only. Various modifications and adaptions will be readily apparent to those of skill in the art. Accordingly, the scope of the present invention should be determined by reference to the claims appended hereto.

What is claimed is:

1. A method comprising the steps of:
   producing a bead by moving a bead producing tool along one or more workpieces, said bead having first and second bead wetting angles, each bead wetting angle being between a corresponding edge of said bead and an adjacent surface on said one or more workpieces;
   generating profile information by use of at least a first optical profiler head moved along said bead, said profile information representative of the profile of at least part of said bead behind said bead producing tool;
   deriving bead wetting angle data representative of at least one of said first and second bead wetting angles from said profile information;
   comparing the bead wetting angle data to at least one reference;
   calculating a changed value for at least one parameter, which parameter affects at least one of said bead wetting angles, said changed value of said at least one parameter being dependent on the results of the comparison; and
   changing the operation of said bead producing tool based on the changed value of said at least one parameter to realize feedback control of said at least one of said first and second bead wetting angles.

2. The method of claim 1 wherein said bead producing tool is a welding torch and said at least one parameter is selected from the group of welding torch voltage, welding torch current, speed of travel of the welding torch, and wire feed rate, if any, to the welding torch.

3. The method of claim 2 wherein the calculating step includes calculating changed values for two parameters which affect said at least one of said bead wetting angles, said changing of the operation of the bead producing tool based on changed values of said two parameters, and said two parameters include a wire feed rate and the welding torch current.

4. The method of claim 2 wherein the calculating step includes calculating changed values for two parameters which affect said at least one of said bead wetting angles, said changing of the operation of the bead producing tool based on changed values of said two parameters, and said two parameters include a wire feed rate and the welding torch voltage.

5. The method of claim 2 wherein said at least one parameter is the speed of travel of the welding torch.

6. The method of claim 2 wherein said bead wetting angle data is representative of the first bead wetting angle along a first edge of the bead and the second bead wetting angle along a second edge of the bead and feedback control of both the first and second bead wetting angles is accomplished by said changing step.

7. The method of claim 6 wherein the profile information is supplied from moving the first optical profiler head along the first edge of the bead and moving a second optical profiler head along the second edge of the bead.

8. The method of claim 6 wherein the first and second bead wetting angles are controlled to be positive and less than a predetermined value.

9. The method of claim 1 wherein said bead wetting angle data is representative of the first bead wetting angle along a first edge of the bead and the second bead wetting angle along a second edge of the bead and wherein the profile information is supplied from moving the first optical profiler head along the first edge of the bead and moving a second optical profiler head along the second edge of the bead 10. The method of claim 9 further comprising the steps of controlling the position of the first optical profiler head such that the first edge remains in the field of view of the first optical profiler head and controlling the position of the second optical profiler head such that the second edge remains in the field of view of the second optical profiler.

11. A system for bead production quality control comprising:
   A bead producing tool operable to produce a bead upon one or more workpieces, said bead having first and second bead wetting angles, each bead wetting angle being between a corresponding edge of said bead and an adjacent surface on said one or more workpieces;
   a first optical profiler head operable to generate profile information from said bead behind said bead producing tool;
   means for processing said profile information and deriving bead wetting angle data representative of at least one of said first and second bead wetting angles from said profile information;
   calculation means for comparing said bead wetting angle data to at least one reference and for calculating changed values for at least one parameter, which parameter effects said at least one of said bead wetting angles; and
   control means responsive to said calculation means and operable to change the operation of the bead producing tool based on changed values of said at least one parameter and providing feedback control of said at least one of said bead wetting angles.

12. The system of claim 11 wherein said bead producing tool is a welding torch and said at least one parameter is selected from the group of welding torch voltage, welding torch current, speed of travel of the welding torch, and wire feed rate, if any, to the welding torch.

13. The system of claim 12 wherein the calculation means calculates changed values for two parameters which affect said at least one of said bead wetting angles and changes the operation of the bead producing tool based on changed values of said two parameters, and said two parameters include a wire feed rate and the welding torch current.

14. The system of claim 11 wherein said at least one parameter includes the speed of travel of the welding torch.

15. The system of claim 11 further comprising a second optical profiler head operable to generate profile information from said bead behind said bead producing tool, and wherein said means for processing derives bead wetting angle data representative of said first bead wetting angle from operation of said first optical profiler head and independent of said second optical profiler head, and wherein said means for processing derives bead wetting angle data representative of said second bead wetting angle from operation of said second optical profiler head and independent of said first optical profiler head.

16. The system of claim 15 wherein said bead producing tool is a welding torch and said at least one parameter is selected from the group of welding torch voltage, welding torch current, speed of travel of the welding torch, and wire feed rate, if any, to the welding torch.

17. A method comprising the steps of:
   moving first and second optical profiler heads adjacent a bead on one or more workpieces, the bead having first and second bead wetting angles, each bead wetting angle being between a corresponding edge of the bead and an adjacent surface on the one or more workpieces, the first optical profiler bead having a first field of view including a first edge of said bead, the second optical profiler head having a second field of view including a second edge of said bead;
   generating profile information from signals from said first and second optical profiler heads; and deriving bead wetting angle data representative of the first and second bead wetting angles from said profile information; and
   wherein said deriving step includes deriving bead wetting angle data representative of said first bead wetting angle from operation of said first optical profiler head and independent of said second optical profiler head, and said deriving step includes deriving bead wetting angle data representative of said second bead wetting angle from operation of said second optical profiler head and independent of said first optical profiler head.

18. The method of claim 17 wherein said first edge is not within said second field of view and said second edge is not within said first field of view.

19. The method of claim 17 further comprising the steps of:
   producing the bead by moving a bead producing tool along the one or more workpieces; calculating a changed value for at least one parameter, which parameter affects at least one of said bead setting angles, said changed value of said at least one parameter being dependent on the results of the comparison; and
   changing the operation of said bead producing tool based on the changed value of said at least one parameter to realize feedback control of both of said first and second bead wetting angles.

20. The method of claim 19 wherein said bead producing tool is a welding torch and said at least one parameter is selected from the group of welding torch voltage, welding torch current, speed of travel of the welding torch, and wire feed rate, if any, to the welding torch.

* * * * *